(12) United States Patent
Kim

(10) Patent No.: US 7,815,251 B2
(45) Date of Patent: Oct. 19, 2010

(54) UNDER-BODY FRAME OF VEHICLE

(75) Inventor: Yong Kew Kim, Anyang-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 12/391,946

(22) Filed: Feb. 24, 2009

(65) Prior Publication Data
US 2010/0060041 A1    Mar. 11, 2010

(30) Foreign Application Priority Data
Sep. 8, 2008    (KR) ...................... 10-2008-0088489

(51) Int. Cl.
*B62D 21/02*    (2006.01)
(52) U.S. Cl. ...................................................... 296/204
(58) Field of Classification Search ................. 296/204, 296/203.01, 203.04, 193.07, 193.01; 180/311
See application file for complete search history.

(56) References Cited

FOREIGN PATENT DOCUMENTS

| JP | 56-152774 U | 11/1981 |
|---|---|---|
| JP | 2001-213359 A | 8/2001 |
| JP | 2006-315445 A | 11/2006 |
| JP | 2007-276623 A | 10/2007 |

*Primary Examiner*—Hilary Gutman
(74) *Attorney, Agent, or Firm*—Morgan, Lewis & Bockius LLP

(57) ABSTRACT

An under-body frame of a vehicle may include a floor constituting a lower part of a vehicle, rear side frames installed at both side ends of a rear portion of the floor, mounting brackets which are installed in front of wheel arch portions of the rear side frames, respectively, and in and to which front ends of trailing arms of a rear suspension device are inserted and fixed, and/or a rear cross member installed to extend across the floor from a side of the floor to the opposite side of the floor and having both ends fixed to the mounting brackets which are installed at opposite sides, respectively. With the under-body frame, it is possible to increase fixation security of a trailing arm of a suspension device and enhance safety of inside parts of a vehicle when a rear impact occurs.

9 Claims, 6 Drawing Sheets

UNDER-BODY FRAME OF VEHICLE

CROSS-REFERENCE TO RELATED APPLICATION

The present application claims priority of Korean Patent Application Number 10-2008-0088489 filed Sep. 8, 2008, the entire contents of which application is incorporated herein for all purposes by this reference.

BACKGROUND OF THE INVENTION

1. Field of the Invention

The present invention relates to an under-body frame of a vehicle including a floor of a vehicle, a mounting bracket on which a trailing arm of a rear suspension device is mounted, and various members for maintaining stiffness of the vehicle.

2. Description of Related Art

A lower part of a vehicle is structured such that various parts are installed on a panel called a floor. The floor comprises a front part and a rear part. Various parts are installed on a vehicle floor. The rear part of the floor is provided with rear wheel arches. The rear part of the floor is provided with side fires at both side ends thereof A rear suspension device is installed at a lower portion of the floor so as to be positioned near the rear wheel arch for maintaining driving stability. A representative of the An example of a rear suspension device is a Coupled Torsion Beam Axle (CTBA). In the CTBA, a torsion beam extending at a middle portion of the floor and trailing arms installed at both ends of the torsion beam serve as a frame. The trailing arm is provided with a coil spring and a shock absorber. The torsion beam prevents an axis of the vehicle from shaking using recovery force against torsion and is applied with lateral force, rear-to-front longitudinal force, and brake moment. The fixation of a portion to which the trailing arm is fixed and the lower part of the vehicle around the fixed portion must be sufficiently secured in order to draw the maximum performance out of the suspension device.

However, the known suspension device is designed focusing on the layout of a lower part of the vehicle and the inside space of the vehicle rather than considering mounting fixation security. For such a reason, the suspension device cannot sufficiently perform its intrinsic function, and durability of the suspension device decreases as time passes. Further, it is needed to change the mounting structure of the known suspension device to increase steering stability and comfortableness of riding in the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, the present invention has been made keeping in mind the above problems occurring in the related art, and an object of the present invention is to provide an under-body frame of a vehicle which is capable of increasing stiffness of a rear suspension device by more securely fixing a trailing arm and enhancing the safety of a vehicle when a rear impact occurs.

One aspect of the present invention is directed to an under-body frame for a vehicle, including a floor including a front and a rear portion, the rear portion having two sides, a rear side frame installed at each side of the rear portion of the floor and defining a wheel arch, a mounting bracket attached to each rear side frame in front of the wheel arch, each configured for a front end of a trailing arm of a rear suspension device to be attached thereto, and/or a rear cross member extending laterally across the floor and having two ends, each fixed to one of the mounting brackets.

The rear cross member may define a substantially straight line between the mounting brackets. The under-body frame of a vehicle may include an inner side sealing member attached to each mounting bracket. The under-body frame of a vehicle may include a front reinforcement member extending across each rear side frame and supporting a front side of the mounting bracket. The under-body frame of a vehicle may include a side reinforcement member disposed at a side of each inner side sealing member with a space between the side reinforcement member and the inner side sealing member to support a side of the mounting bracket.

The under-body frame of a vehicle may include a front cross member extending laterally across the floor in front of the rear cross member, and/or a connection member installed between the front and rear cross members. The front and rear cross-members may be configured for a front end and a rear end of a seat rail, respectively, to be attached thereto. Each of the mounting brackets may define an opening in a direction in which the trailing arm may be attached.

Other aspects of the present invention are directed to a passenger vehicle that may include any of the above-mentioned under-body frames of a vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
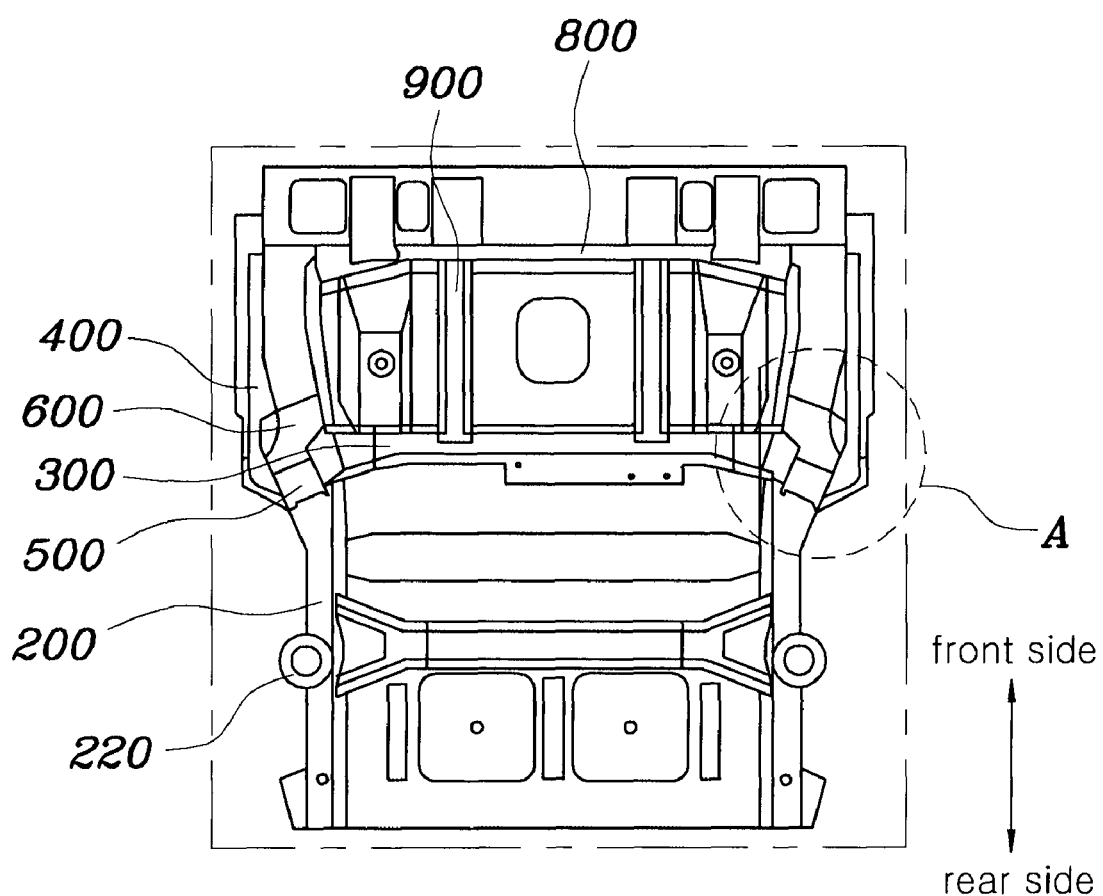
FIG. 1 is a view illustrating an exemplary structure of an under-body frame of a vehicle according to various aspects of the invention.

FIG. 1 shows an under-body frame of a vehicle according to one embodiment of the invention. The view of FIG. 1 is viewed from the underside of the under-body frame. The under-body frame of a vehicle includes a floor 100 which constitutes lower part of a vehicle, rear side frames 200 installed at both sides of a rear portion of the floor 100, mounting brackets 500 which are installed in front of wheel arch portions 120 of the rear side frames 200, respectively and in which front portions 16 of trailing arms of rear suspension devices 10 are received and fixed, respectively, and a rear cross member 300 extending laterally across the floor 100 from a side to the opposite side and having ends fixed to the mounting brackets 500, respectively.

The floor 100 is a panel constituting the lower part of the vehicle and includes a front portion and a rear portion. The rear portion of the floor 100 has the rear side frames 200 installed at both sides thereof and extending in the longitudinal direction of the floor. The floor 100 also has front wheel arch portions and rear wheel arch portions. The rear side frames 200 are combined with the floor 100 while running over the wheel arch portions. The rear wheel arch portions are provided with a rear steering device. The rear steering device includes a torsion beam, and a trailing arm disposed on both sides of the torsion beam. A front end 16 of each of the trailing arms 14 is installed on the floor 100 and a rear end of the each of the trailing arms is installed to a spring support 220 via a coil spring. The front end 16 of each of the trailing arms 14 is fixed to the mounting bracket 500. The mounting brackets 500 are installed in front of the rear wheel arch portions, respectively. The mounting bracket 500 has a box shape and has an opening in a direction in which the front end 16 of the trailing arm 14 is inserted. The front end 16 of the trailing arm 14 is inserted into the mounting bracket 500 through the opening and the mounting bracket 500 is one-body type bracket so that it fixes the front end 16 of the trailing arm 14 by surrounding the front end. With such a structure, the front end of the trailing arm can be more securely fixed and security of the fixation is increased.

Figure 2:
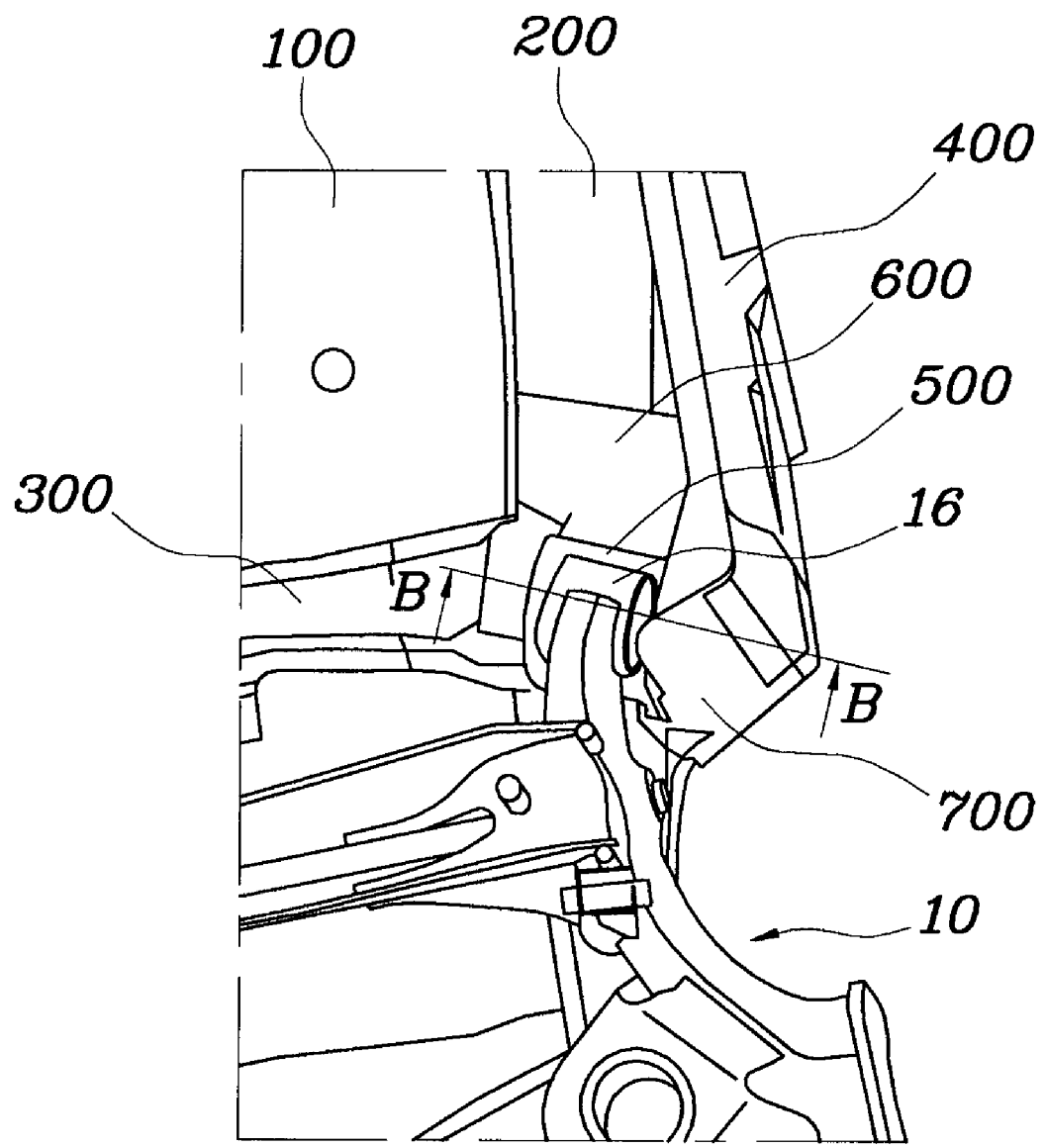
FIG. 2 is an enlarged perspective view illustrating a portion A of the under-body frame of a vehicle of FIG. 1.
Figure 3:
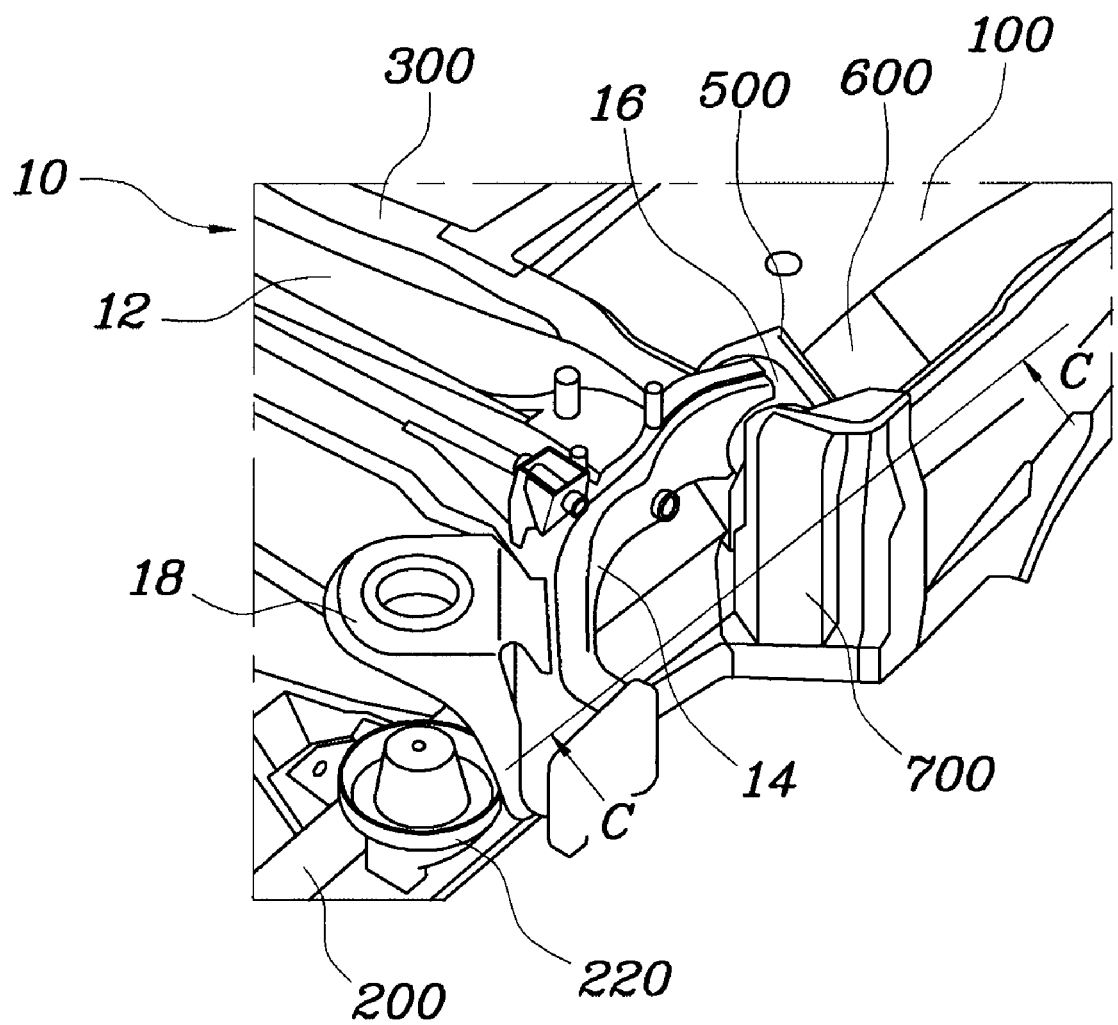
FIG. 3 is an another enlarged perspective view illustrating the portion A of the under-body frame of a vehicle of FIG. 1.

A fixing structure and method of the front ends 16 of the trailing arms 14 will be described in more detail with reference to FIGS. 2 and 3. The front end 16 of each of the trailing arms 14 directly receives distortion force of the torsion bar 12. Accordingly, the fixation of the front end of the trailing arm must be secure. For such a reason, the rear cross member 300 is installed on the floor 100 in such a manner that it extends laterally across the floor 100 from side to side. Both ends of the rear cross member 300 are fixed to the opposite mounting brackets 500, respectively. The rear cross member 300 is fixed to the brackets 500 opposite to each other while extending across the floor 100 from side to side and also. Thus, the rear cross member 300 fixes the mounting brackets 500 in the lateral and vertical directions. It is preferable that the rear cross member 300 extends in a straight line that connects the mounting brackets 500 in order to enhance the supporting function of the rear cross member 300.

On the other hand, inner side sealing members 400 are installed on outer sides of the rear side frames 200 and the mounting brackets 500 disposed at both sides the vehicle, respectively. Each of the inner side sealing members 400 is combined with an outer side sealing member (not shown) so as to provide a predetermined space therebetween while supporting the corresponding mounting bracket 500. Further, side reinforcement members 700 which support the corresponding mounting brackets 500 are installed on the outer sides of the inner side members 400, respectively while having spaces 720 between the inner side members 400 and the side reinforcement members 700. As shown in the figure, the side reinforcement member 700 is combined with the inner side sealing member 400 at which the mounting bracket 500 is disposed. An upper end and a lower end of the side reinforcement member 700 are bent to define a space therebetween. The side reinforcement 700 further enhances the fixation security of the corresponding mounting bracket 500 in the lateral direction and vertical direction of the vehicle along with the rear cross member 300. A front reinforcement member 600 is fixed to extend across the rear side frame 200 and the inner side sealing member 400 and installed to supports the mounting bracket 500 from the front side of the mounting bracket 500. The front reinforcement member 600 is fixed to the rear side frame 200 and to the inner side sealing member 400 at the front side of the mounting bracket 500 and extends toward the rear side, and therefore the front reinforcement member 600 surrounds the mounting bracket 500. The front reinforcement member 600 supports the front side of the mounting bracket 500 in order to enhance the fixation security in the longitudinal direction of the vehicle.

Thanks to the one-body type shape of the mounting bracket, the rear cross member, the inner side sealing member, the side reinforcement member, and the front reinforcement member, the support force of the front end of the trailing arm is enhanced. Particularly, the fixation of the mounting bracket is secured by the support force along three axes: the lateral direction, the vertical direction, and the longitudinal direction of the vehicle. As a result, it is possible to stably support the torsion bar and ensure durability of the mounting bracket.

Figure 4:
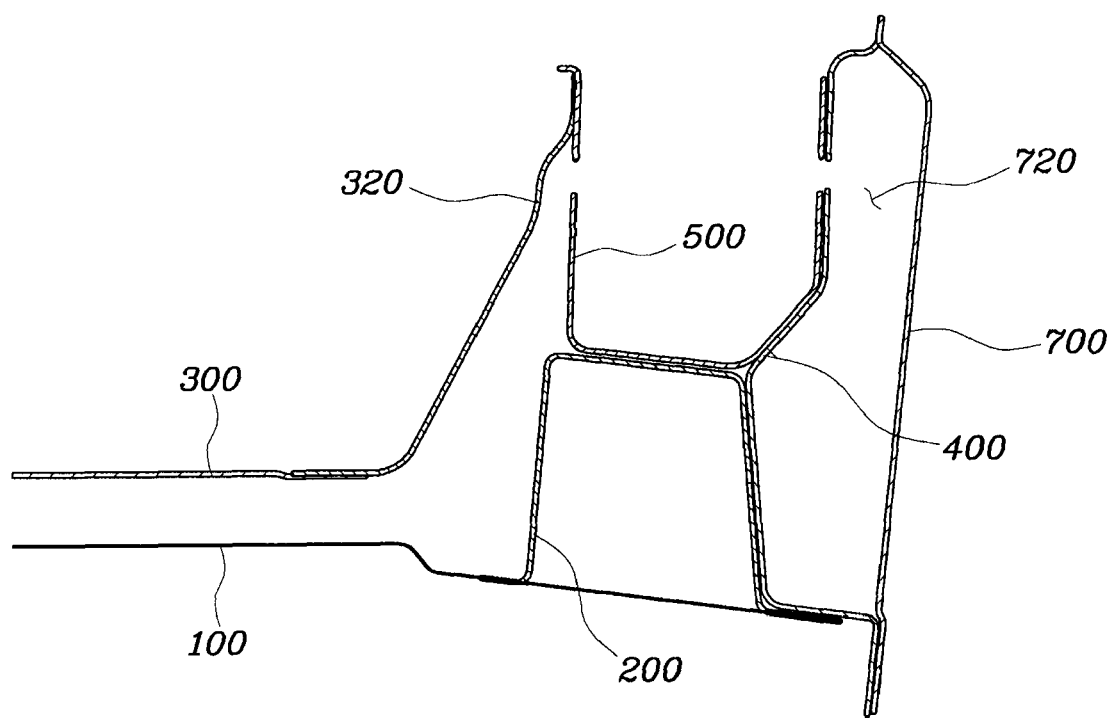
FIG. 4 is a sectional view taken along line B-B of FIG. 2.

Combination of the members will be described with reference to FIGS. 4 and 5. FIG. 4 is a vertical-sectional view illustrating the mounting bracket 500. The rear side frames 200 are installed on the floor 100, cup-shaped mounting brackets 500 are installed at upper end portions of the rear side frames 200, and the front ends of the trailing arms are fixed within the mounting brackets 500. The left side of the mounting bracket 500 is supported by the rear cross member 300, and the right side of the mounting bracket 500 is provided with the inner side sealing member 400. The side reinforcement member 700 is installed at the outer side of the inner side sealing member 400 with a space therebetween.

Figure 5:
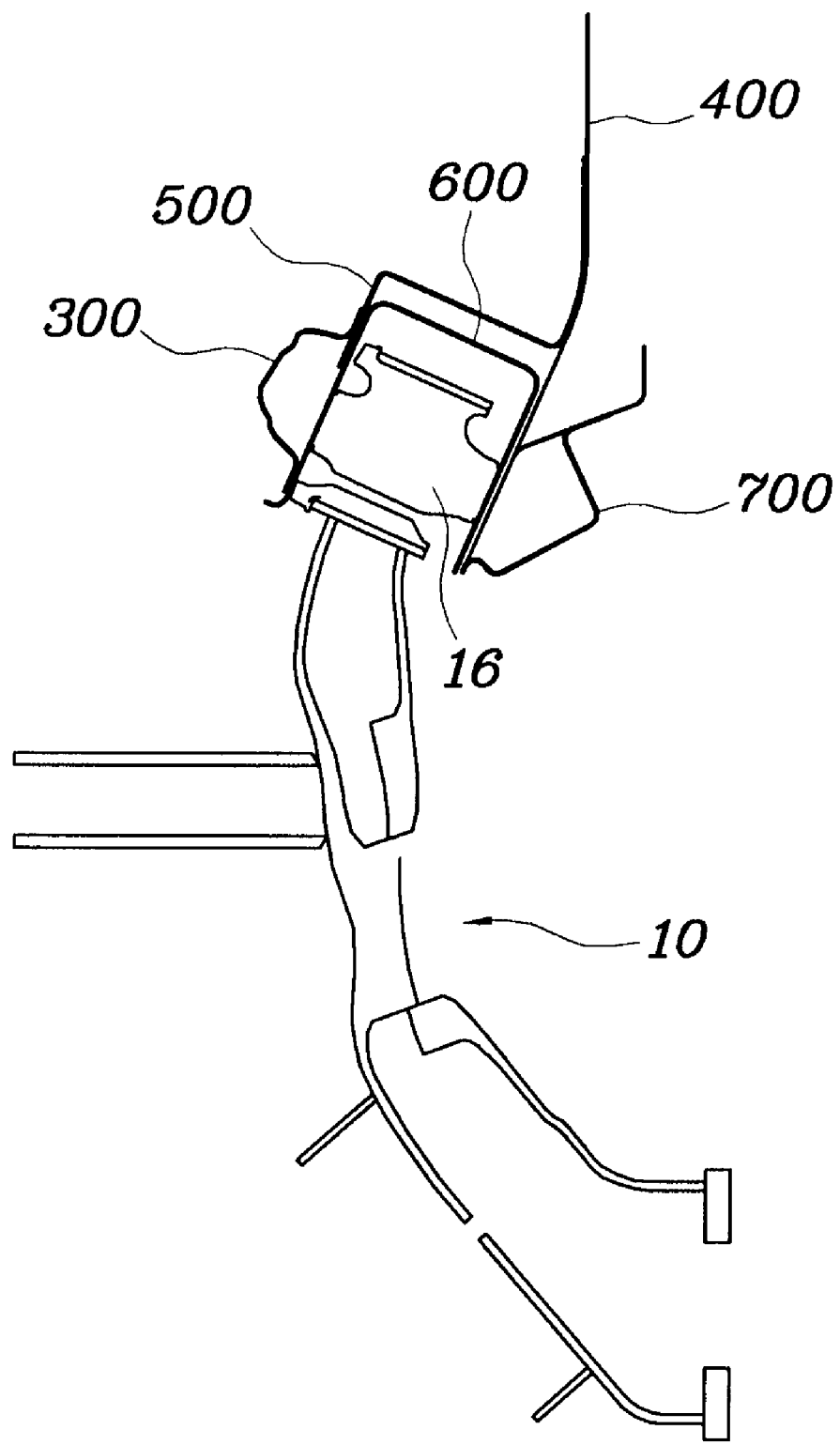
FIG. 5 is a sectional view taken along line C-C of FIG. 3.

FIG. 5 is a horizontal-sectional view illustrating the trailing arm. The front end 16 of the trailing arm is inserted into and fixed to the mounting bracket 500. The mounting bracket 500 is supported at the left side thereof by the rear cross member 300, at the front side by the front reinforcement member 600, and at the right side by the inner side sealing member 400. The inner side sealing member 400 is supported by the side reinforcement member 700.

Figure 6:
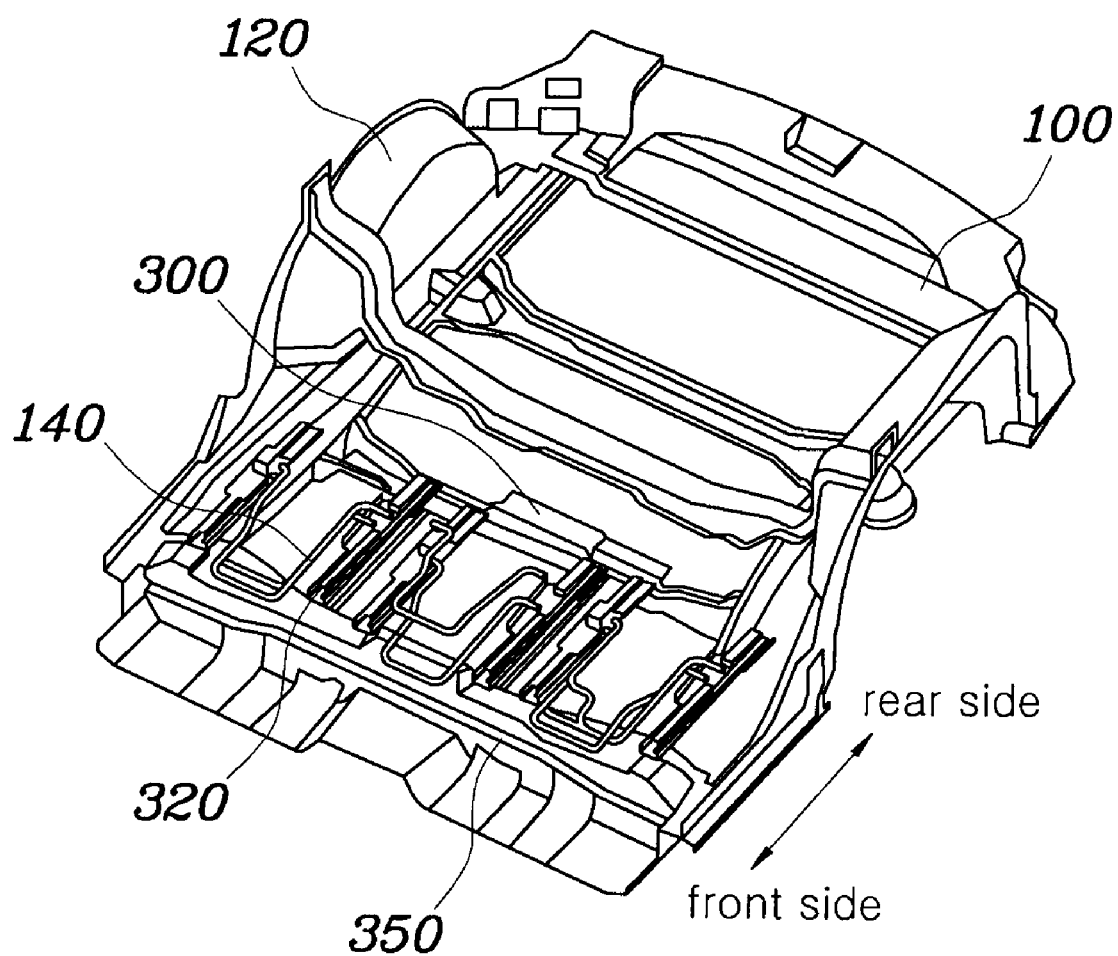
FIG. 6 is a perspective view illustrating the under-body frame of FIG. 1.

FIG. 6 is a perspective view illustrating the under-body frame of the vehicle which is viewed from the topside thereof. The rear side frames 200 are installed at both sides of the floor 100 and the floor has wheel arch portions 120. The mounting brackets 500 are installed in front of the corresponding wheel arch portions 120. The rear cross member 300 is installed between the mounting brackets 500. A front cross member 350 is installed at the front side of the rear cross member 300 to extend laterally across the floor 100. A connection member 320 is installed between the front and rear cross members 300 and 350.

A seat rail 140 is provided to let a rear seat (not shown) slide thereon. Its ends are fixed to the cross members 300 and 350, respectively. The front and rear cross members 300 and 350, and the connection member 320 connected between the front and rear cross members 300 and 350 ensures the stiffness of the vehicle to resist against a shock applied to a rear side of the vehicle. A space between the front and rear cross members 300 and 350 is provided with a fuel tank, so the stiffness of the vehicle must be ensured because the stiffness of a fuel tank receiving portion of the vehicle results in safety. Since the rear cross member 300 serves as a rear end of the seat rail 140, a separate seat rail bracket is not necessary, which results in cost reduction.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An under-body frame for a vehicle, comprising:
   a floor including a front portion and a rear portion, the rear portion having two sides;
   a rear side frame installed at each side of the rear portion of the floor and defining a wheel arch;
   a mounting bracket attached to each rear side frame in front of the wheel arch, wherein a front end of a trailing arm of a rear suspension device is attached to the mounting bracket; and
   a rear cross member extending laterally across the floor and having two ends, each fixed to one of the mounting brackets respectively, wherein the mounting bracket is fixed to an upper end portion of the rear side frame.

2. The under-body frame of a vehicle according to claim 1, wherein the rear cross member defines a substantially straight line between the mounting brackets.

3. The under-body frame of a vehicle according to claim 1, further comprising an inner side sealing member attached to each mounting bracket.

4. The under-body frame of a vehicle according to claim 3, further comprising a side reinforcement member disposed at a side of each inner side sealing member with a space between the side reinforcement member and the inner side sealing member to support a side of the mounting bracket.

5. The under-body frame of a vehicle according to claim 1, further comprising a front reinforcement member extending across each rear side frame and supporting a front side of the mounting bracket.

6. The under-body frame of a vehicle according to claim 1, further comprising:
   a front cross member extending laterally across the floor in front of the rear cross member; and
   a connection member installed between the front and rear cross members.

7. The under-body frame of a vehicle according to claim 6, wherein the front and rear cross-members are configured for a front end and a rear end of a seat rail, respectively, to be attached thereto.

8. The under-frame body of a vehicle according to claim 1, wherein each of the mounting brackets defines an opening in a direction in which the trailing arm is attached.

9. A passenger vehicle comprising the under-body frame of a vehicle according to claim 1.

* * * * *